(12) United States Patent
Yuan et al.

(10) Patent No.: US 12,432,107 B2
(45) Date of Patent: Sep. 30, 2025

(54) SYMBOL SENDING METHOD, SYMBOL RECEIVING METHOD, SENDING DEVICE, RECEIVING DEVICE, AND STORAGE MEDIUM

(71) Applicant: ZTE CORPORATION, Shenzhen (CN)

(72) Inventors: Zhifeng Yuan, Shenzhen (CN); Yu Xin, Shenzhen (CN); Guanghui Yu, Shenzhen (CN); Liujun Hu, Shenzhen (CN); Jin Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 84 days.

(21) Appl. No.: 18/555,418

(22) PCT Filed: Apr. 13, 2022

(86) PCT No.: PCT/CN2022/086499
§ 371 (c)(1),
(2) Date: Oct. 13, 2023

(87) PCT Pub. No.: WO2022/218319
PCT Pub. Date: Oct. 20, 2022

(65) Prior Publication Data
US 2024/0129175 A1 Apr. 18, 2024

(30) Foreign Application Priority Data
Apr. 13, 2021 (CN) .......................... 202110397070.5

(51) Int. Cl.
*H04L 27/34* (2006.01)
*H04L 27/38* (2006.01)

(52) U.S. Cl.
CPC .......... *H04L 27/3405* (2013.01); *H04L 27/38* (2013.01)

(58) Field of Classification Search
CPC ........................... H04L 27/3405; H04L 27/38
See application file for complete search history.

(56) References Cited

U.S. PATENT DOCUMENTS

| 2011/0158349 A1* | 6/2011 | Wu ..................... H04L 27/3411 375/295 |
| 2015/0043680 A1 | 2/2015 | Rodriquez et al. |
| 2020/0127880 A1* | 4/2020 | Szili ..................... H04L 27/3422 |

FOREIGN PATENT DOCUMENTS

CN 108989253 A 11/2018

OTHER PUBLICATIONS

International Search Report in Application No. PCT/CN2022/086499, dated Jul. 11, 2022, 4 pages including translation.
(Continued)

*Primary Examiner* — Janice N Tieu
(74) *Attorney, Agent, or Firm* — Morgan, Lewis & Bockius LLP (57) ABSTRACT

Provided are a symbol sending method, a symbol receiving method, a sending device, a receiving device, and a storage medium. The symbol sending method includes the following: modulating two bits according to a model of a first constellation diagram to obtain a transmission symbol, where the model of the first constellation diagram satisfies the following: four vertices of the first constellation diagram form a rhombus, the lengths of the two diagonal lines of the rhombus are unequal, and each vertex corresponds to one value of the two bits; and sending the transmission symbol.

19 Claims, 7 Drawing Sheets

Modulate (2+M) bits according to a model of a second constellation diagram to obtain a transmission symbol, where M is a positive integer, the model of the second constellation diagram satisfies the following: 4*D vertices of the constellation diagram form D rhombuses, the lengths of the two diagonal lines of each rhombus are unequal, the D rhombuses do not intersect, each vertex corresponds to one value of the (2+M) bits, and D = $2^M$ — 210

Send the transmission symbol — 220

(56) References Cited

OTHER PUBLICATIONS

Extended European Search Report in Application No. 22787541.6, dated Mar. 21, 2025, 9 pages.
Moufida Hajjaj et al., "A Rhombic-DCM Constellation for MB-OFDM UWB Systems", 2015 International Wireless Communications and Mobile Computing Conference (IWCMC), IEEE, Aug. 24, 2015, pp. 256-261, XP033225365, DOI: 10.1109/IWCMC.2015.7289092.

* cited by examiner

FIG. 1

Modulate two bits according to a model of a first constellation diagram to obtain a transmission symbol, where the model of the first constellation diagram satisfies the following: four vertices of the constellation diagram form a rhombus, the lengths of the two diagonal lines of the rhombus are unequal, and each vertex corresponds to one value of the two bits ~110

Send the transmission symbol ~120

SYMBOL SENDING METHOD, SYMBOL RECEIVING METHOD, SENDING DEVICE, RECEIVING DEVICE, AND STORAGE MEDIUM

CROSS REFERENCE TO RELATED APPLICATIONS

This is a National Stage Application, filed under 35 U.S.C. 371, of International Patent Application No. PCT/CN2022/086499, filed on Apr. 13, 2022, which claims priority to a Chinese patent application No. 202110397070.5 filed on Apr. 13, 2021, the disclosures of which are incorporated herein by reference in their entireties.

TECHNICAL FIELD

The present application relates to the field of data modulation, for example, a symbol sending method, a symbol receiving method, a sending device, a receiving device, and a storage medium.

BACKGROUND

Constellation points in a constellation diagram (or a constellation) can reflect the possible states of the amplitude and phase of transmitted data. For the data modulated and demodulated based on the constellation diagram, the amplitude imbalance and the phase error under various modulation modes can be intuitively identified, and the bit error ratio can be determined, thereby simplifying the analysis of data transmission performance. During data transmission, a multiplicative channel with a phase noise, a frequency offset, a time offset, etc. can cause a modulated transmission symbol to rotate, that is, the phase of the transmission symbol changes. Moreover, when a modulated transmission symbol is converted into a point, due to the presence of additive white Gaussian noise (AWGN) in the transmission process, the point corresponding to the received transmission symbol is often not the point corresponding to the transmitted transmission symbol but is around the point corresponding to the transmitted transmission symbol. For a scenario where a channel having the AWGN and the multiplicative channel having the phase noise and the like simultaneously exist, the points corresponding to the received transmission symbols are neither uniformly distributed within a decision region, nor do they show the Gaussian distribution. In a modulation process such as pulse amplitude (PAM) modulation, phase-shift keying (PSK) modulation, and quadrature amplitude modulation (QAM) modulation, the constellation diagram is not reasonably designed, the decision region based on which a receiving end demodulates the received transmission symbols is a uniform ring or sector, and such a decision region does not match the true distribution of the points corresponding to the received symbols, affecting the demodulation performance and resulting in a high bit error ratio and low accuracy of data transmission.

SUMMARY

The present application provides a symbol sending method, a symbol receiving method, a sending device, a receiving device, and a storage medium to reduce the bit error ratio and improve the accuracy of data transmission.

Embodiments of the present application provide a symbol receiving method. The method includes the following.

Two bits are modulated according to a model of a first constellation diagram to obtain a transmission symbol, where the model of the first constellation diagram satisfies the following: four vertices of the constellation diagram form a rhombus, the lengths of the two diagonal lines of the rhombus are unequal, and each vertex corresponds to one value of the two bits; and the transmission symbol is sent.

The embodiments of the present application provide a symbol sending method. The method includes the following.

(2+M) bits are modulated according to a model of a second constellation diagram to obtain a transmission symbol, where M is a positive integer, the model of the second constellation diagram satisfies the following: 4*D vertices of the constellation diagram form D rhombuses, the lengths of the two diagonal lines of each rhombus are unequal, the D rhombuses do not intersect, each vertex corresponds to one value of the (2+M) bits, and $D=2^M$; and the transmission symbol is sent.

The embodiments of the present application further provide a symbol receiving method. The method includes the following.

A transmission symbol is received; a decision region corresponding to each value of two bits is determined according to a model of a first constellation diagram, where the model of the first constellation diagram satisfies the following: four vertices of the constellation diagram form a rhombus, the lengths of the two diagonal lines of the rhombus are unequal, and each vertex corresponds to one value of the two bits; and the transmission symbol is demodulated according to the decision region to obtain the two bits.

The embodiments of the present application further provide a symbol receiving method. The method includes the following.

A transmission symbol is received; a decision region corresponding to each value of (2+M) bits is determined according to a model of a second constellation diagram, where M is a positive integer, the model of the second constellation diagram satisfies the following: 4*D vertices of the constellation diagram form D rhombuses, the lengths of the two diagonal lines of each rhombus are unequal, the D rhombuses do not intersect, each vertex corresponds to one value of the (2+M) bits, and $D=2^M$; and the transmission symbol is demodulated according to the decision region to obtain the (2+M) bits.

The embodiments of the present application further provide a sending device. The sending device includes a memory, a processor, and a computer program stored on the memory and executable by the processor, and when executing the program, the processor performs the symbol sending method described above.

The embodiments of the present application further provide a receiving device. The receiving device includes a memory, a processor, and a computer program stored on the memory and executable by the processor, and when executing the program, the processor performs the symbol receiving method described above.

The embodiments of the present application further provide a computer-readable storage medium. The computer-readable storage medium is configured to store a computer program, and when executed by a processor, the program implements the symbol sending method or the symbol receiving method described above.

DETAILED DESCRIPTION

The present application is described hereinafter in conjunction with drawings and embodiments. The embodiments described herein are intended to explain the present application and are intended not to limit the present application. For ease of description, only part of the content related to the present application is illustrated in the drawings.

Each transmission symbol after modulation may be represented as one complex number and may be considered as a point in the complex plane. In the scenario where a channel having the AWGN and the multiplicative channel having the phase noise and the like simultaneously exist, the distribution characteristics of points corresponding to modulated transmission symbols are affected, and for a receiving end, the points corresponding to the received transmission symbols are not uniformly distributed in a decision region.

Figure 1:
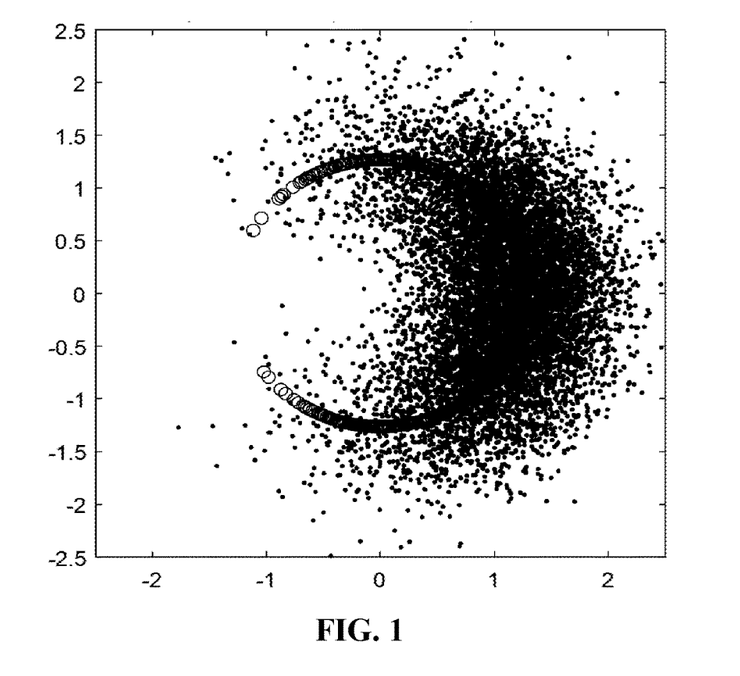
FIG. 1 is a schematic diagram of the distribution of points corresponding to the received transmission symbols in a scenario where a channel having the AWGN and a multiplicative channel having the phase noise and the like simultaneously exist.

FIG. 1 is a schematic diagram of the distribution of points corresponding to the received transmission symbols in a scenario where a channel having the AWGN and the multiplicative channel having the phase noise and the like simultaneously exist. As shown in FIG. 1, for the transmitted symbol "1", if the phase noise exists, the modulated transmission symbols rotate, and the points received by a receiving end after modulation may appear in the black curved region; and if the AWGN also exists, the region where the received points may appear is relatively wide in the middle part (the part with the vertical axis coordinates close to 0, which is also the part with a higher probability of appearance) and is relatively narrow at the upper and lower ends (the parts with the vertical axis coordinates far from 0, which are also the parts with a lower probability of appearance), and the whole region is in a shape similar to a crescent. PAM, PSK, QAM, and other modulation modes modulate data using a constellation diagram that is symmetric about the origin, the decision region based on which the receiving end demodulates the received transmission symbols is a uniform square, ring or sector, and such a decision region does not match the distribution of the points corresponding to the received symbols in the scenario where a channel having the AWGN and the multiplicative channel having the phase noise and the like simultaneously exist, affecting the demodulation performance and resulting in a high bit error ratio and low accuracy of data transmission.

In the embodiments of the present application, a symbol sending method is provided, and the constellation diagram is redesigned so that the shape of the corresponding decision region is close to a crescent, that is, the part where the probability of appearance of the received points is higher is relatively wide, and the part where the probability of appearance of the received points is lower is relatively narrow, so that the decision region matches the true distribution of the points corresponding to the transmission symbols.

Figure 2:
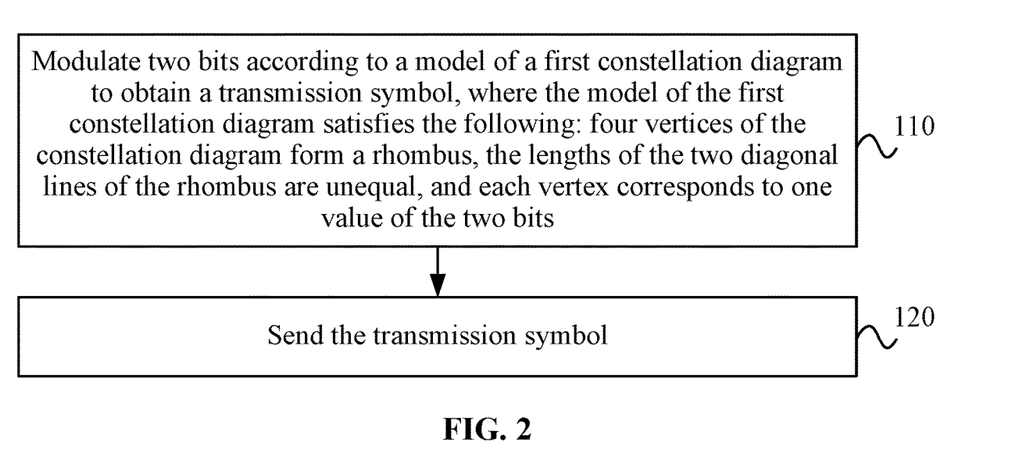
FIG. 2 is a flowchart of a symbol sending method according to an embodiment.

FIG. 2 is a flowchart of a symbol sending method according to an embodiment. As shown in FIG. 2, the method provided in this embodiment includes operations 110 and 120.

In 110, two bits are modulated according to a model of a first constellation diagram to obtain a transmission symbol, where the model of the first constellation diagram satisfies the following: four vertices of the constellation diagram form a rhombus, the lengths of the two diagonal lines of the rhombus are unequal, and each vertex corresponds to one value of the two bits.

In 120, the transmission symbol is sent.

In this embodiment, the model of a first constellation diagram is substantially a constellation diagram containing one rhombus and is used for modulating two bits. One rhombus containing four vertices is defined, each vertex corresponds to one value of two bits, and there are four types of two bits: 00, 01, 10, and 11. The two bits may be modulated according to this constellation diagram to obtain the corresponding transmission symbol. The lengths of the two diagonals of the rhombus are unequal. On this basis, the decision region is not a uniform ring or sector, and points on the boundary of the decision region have unequal curvatures so that the decision region is relatively wide in the part where the probability of appearance of the received points is higher.

In this embodiment, the two bits are to-be-transmitted bits and generally two bits among the bits formed after to-be-transmitted information bits are coded by channel error correction coding and cyclic redundancy check (CRC) coding.

In the method of this embodiment, the data is modulated according to the model of the first constellation diagram so that the corresponding decision region in the demodulation process better matches the true distribution of the points corresponding to the received transmission symbols, thereby reducing the bit error ratio and improving the accuracy of data transmission.

In an embodiment, the locations of the four vertices in the constellation diagram are $A_b*\exp(j*\theta_0)$, $A_s*\exp(j*(\pi/2+\theta_0))$, $-A_b*\exp(j*\theta_0)$, and $-A_s*\exp(j*(\pi/2+\theta_0))$, respectively, where $A_b$ and $A_s$ are two unequal real numbers, and $\theta_0$ is a real number.

In some embodiments, the locations of the four vertices in the constellation diagram may also be represented as $A_b*\exp$ ($j*\theta_0$), $j*A_s*\exp(j*\theta_0)$, $-A_b*\exp(j*\theta_0)$, and $-j*A_s*\exp(j*\theta_0)$, respectively. $A_b$ and $A_s$ are unequal so that the decision region is relatively wide in the part where the probability of appearance of the received points is higher. $\exp(x)=e^x$ is an exponential function, that is, $\exp(j+\theta_n)=e^{j*\theta_n}$. $u*v$ and $uv$ represent the multiplication of $u$ and $v$. $j$ is equal to $\sqrt{-1}$.

In an embodiment, the four vertices correspond to the following values of the two bits: 00, 01, 10, and 11, respectively. Alternatively, the four vertices correspond to the following values of the two bits: 00, 01, 11, and 10, respectively.

Figure 3:
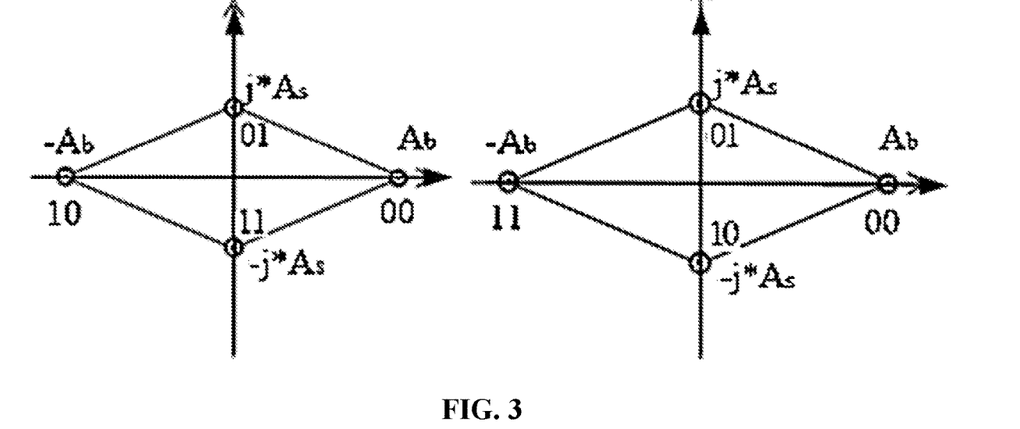
FIG. 3 is a schematic diagram of two models of a first constellation diagram according to an embodiment.

FIG. 3 is a schematic diagram of two models of a first constellation diagram according to an embodiment. In FIG. 3, in the left model of the first constellation diagram, the four vertices $A_b$, $j*A_s$, $-A_b$, and $-j*A_s$ correspond the following values of the two bits: 00, 01, 10, and 11, respectively; and in the right model of the first constellation diagram, the four vertices $A_b$, $j*A_s$, $-A_b$, and $j*A_s$ correspond to the following values of the two bits: 00, 01, 11, and 10, respectively. In this case, the values of the bits corresponding to adjacent vertices are different from each other only in one bit so that even if a received point is falsely decided to be in the decision region where an adjacent vertex is located, the bit error ratio can still be reduced.

The amount $\theta_0$ of rotation for the two models of the first constellation diagram shown in FIG. 3 is equal to 0, that is, the four vertices may be represented as $A_b$, $j*A_s$, $-A_b$, and $-j*A_s$; or $A_b$, $A_s*\exp(j*\pi/2)$, $-A_b$, and $-A_s*\exp(j*\pi/2)$, respectively.

Figure 4:
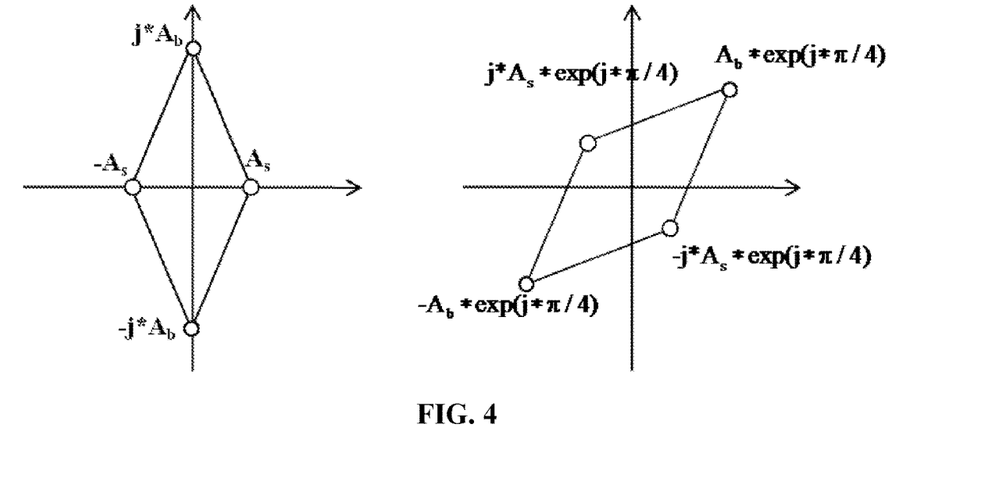
FIG. 4 is a schematic diagram of the rotation of two models of the first constellation diagram according to an embodiment.

FIG. 4 is a schematic diagram of the rotation of two models of the first constellation diagram according to an embodiment. As shown in FIG. 4, in the left model of the first constellation diagram, the amount $\theta_0$ of rotation is equal to $\pi/2$, that is, the four vertices are $A_s$, $j*A_b$, $-A_s$, and $-j*A_b$, respectively; in the right model of the first constellation diagram, $\theta_0=\pi/4$, that is, the four vertices are $A_b*\exp(j*\pi/4)$, $j*A_s*\exp(j*\pi/4)$, $-A_b*\exp(j*\pi/4)$, and $-j*A_s*\exp(j*\pi/4)$, respectively.

In an embodiment, $A_b$ and $A_s$ satisfy that $|A_b|^2+|A_s|^2=2$. On this basis, the power of the model of the first constellation diagram is normalized.

Figure 5:
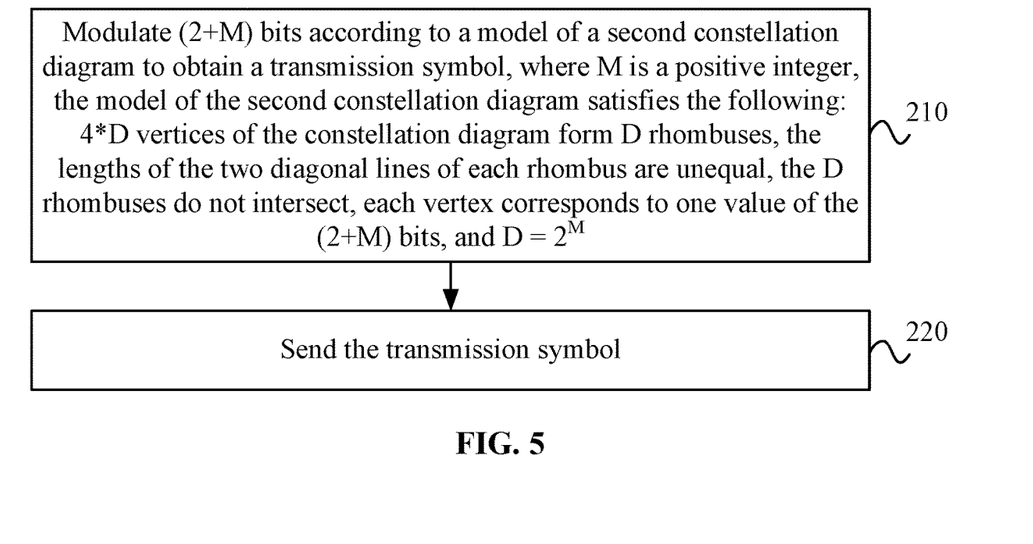
FIG. 5 is a flowchart of another symbol sending method according to an embodiment.

FIG. 5 is a flowchart of another symbol sending method according to an embodiment. As shown in FIG. 5, the method provided in this embodiment includes operations 210 and 220.

In 210, (2+M) bits are modulated according to a model of a second constellation diagram to obtain a transmission symbol, where M is a positive integer, the model of the second constellation diagram satisfies the following: 4*D vertices of the constellation diagram form D rhombuses, the lengths of the two diagonal lines of each rhombus are unequal, the D rhombuses do not intersect, each vertex corresponds to one value of the (2+M) bits, and $D=2^M$.

In 220, the transmission symbol is sent.

In this embodiment, the model of the second constellation diagram is substantially a constellation diagram containing D rhombuses and is used for modulating (2+M) bits (that is, (2+log 2*D) bits). One constellation diagram containing 4*D vertices is defined, with each vertex corresponding to one value of (2+M) bits, and the (2+M) bits have a total of $2^{2+M}$ values. The (2+M) bits may be modulated according to this constellation diagram to obtain a transmission symbol. $A_{bk}$ and $A_{sk}$ ($k=1, 2, \ldots, D$) are not equal to each other.

In this embodiment, (2+M) bits are modulated according to the model of the second constellation diagram so that the corresponding decision region for demodulation matches the true distribution of the points corresponding to the received transmission symbols, thereby reducing the bit error ratio and improving the accuracy and efficiency of data transmission.

Figure 6:
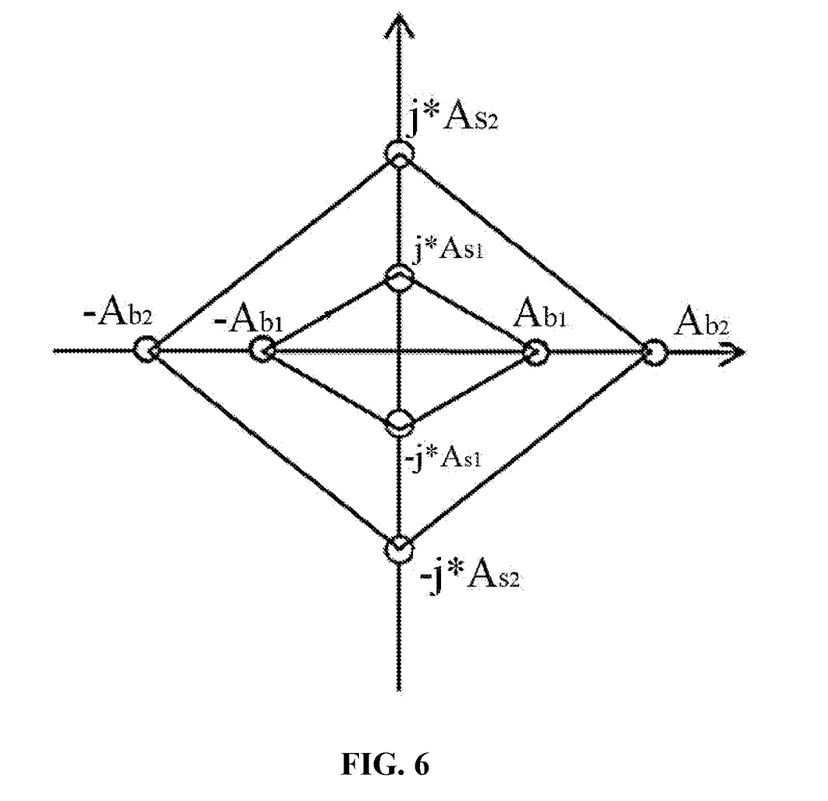
FIG. 6 is a schematic diagram of a constellation diagram containing two rhombuses according to an embodiment.

FIG. 6 is a schematic diagram of a constellation diagram containing two rhombuses according to an embodiment. As shown in FIG. 6, D=2, the two rhombuses together form an eight-point constellation diagram and may be used for modulating 3 (2+log 2*D) bits, and the values of the three bits corresponding to the eight vertices are 000, 001, 010, 011, 100, 101, 110, and 111, respectively.

In an embodiment, the locations of the 4*D vertices in the constellation diagram include $\pm A_{bk}*\exp(j*\theta_0)$ and $\pm A_{sk}*\exp(j*(\pi/2+\theta_0))$, where $k=1, 2, \ldots, D$, $A_{s1}<A_{b1}<A_{s2}<A_{b2}<\ldots<A_{sD}<A_{bD}$, and $\theta_0$ is a real number.

In this embodiment, the locations of the 4*D vertices in the constellation diagram may be represented as: $A_{b1}*\exp(j*\theta_0)$, $A_{s1}*\exp(j*(\pi/2+\theta_0))$, $-A_{b1}*\exp(j*\theta_0)$, $-A_{s1}*\exp(j*(\pi/2+\theta_0))$, $A_{b2}*\exp(j*\theta_0)$, $A_{s2}*\exp(j*(\pi/2+\theta_0))$, $-A_{b2}*\exp(j*\theta_0)$, $-A_{s2}*\exp(j*(\pi/2+\theta_0))$, $\ldots$, $A_{bD}*\exp(j*\theta_0)$, $A_{sD}*\exp(j*(\pi/2+\theta_0))$, $-A_{bD}*\exp(j*\theta_0)$, and $-A_{sD}*\exp(j*(\pi/2+\theta_0))$, respectively, where $A_{s1}, A_{b1}, A_{s2}, A_{b2}, \ldots, A_{sD}$, and $A_{bD}$ are all real numbers, and $A_{s1}<A_{b1}<A_{s2}<A_{b2}<\ldots<A_{sD}<A_{bD}$. At this point, for the multiple rhombuses contained in the model of the second constellation diagram, a larger rhombus may completely enclose a smaller rhombus, and the rhombuses do not overlap, that is, the rhombuses are in a nested relationship. Therefore, even if the transmission symbol rotates, the modulation method in this embodiment still can reduce the false decision and lower the bit error ratio. In addition, the rhombuses may be similar or dissimilar (for example, the two rhombuses shown in FIG. 6 are dissimilar).

In an embodiment, $A_{s1}, A_{b1}, A_{s2}, A_{b2}, \ldots, A_{sD}$, and $A_{bD}$ form an arithmetic progression.

In an embodiment, $A_{s1}, A_{b1}, A_{s2}, A_{b2}, \ldots, A_{sD}$, and $A_{bD}$ are each a product of an element in an arithmetic progression and a power normalization factor.

For example, the values of $A_{s1}, A_{b1}, A_{s2}, A_{b2}, \ldots, A_{sD}$, and $A_{bD}$ form an arithmetic progression, that is, the values may be $[1, 2, 3, \ldots]*\alpha$, $[1, 3, 5, \ldots]*\alpha'$, $[2, 3, 4, 5, \ldots]*\alpha''$ or $[3, 4, 5, \ldots]*\alpha'''$, where $\alpha$, $\alpha'$, $\alpha''$, and $\alpha'''$ are power normalization factors for the constellation diagram.

In the embodiments of the present application, a symbol receiving method is further provided. The decision region corresponding to a constellation diagram for modulating data matches the true distribution of the points corresponding to transmission symbols, and on this basis, the transmission symbols are demodulated, thereby reducing the bit error ratio and improving the accuracy of data transmission.

Figure 7:
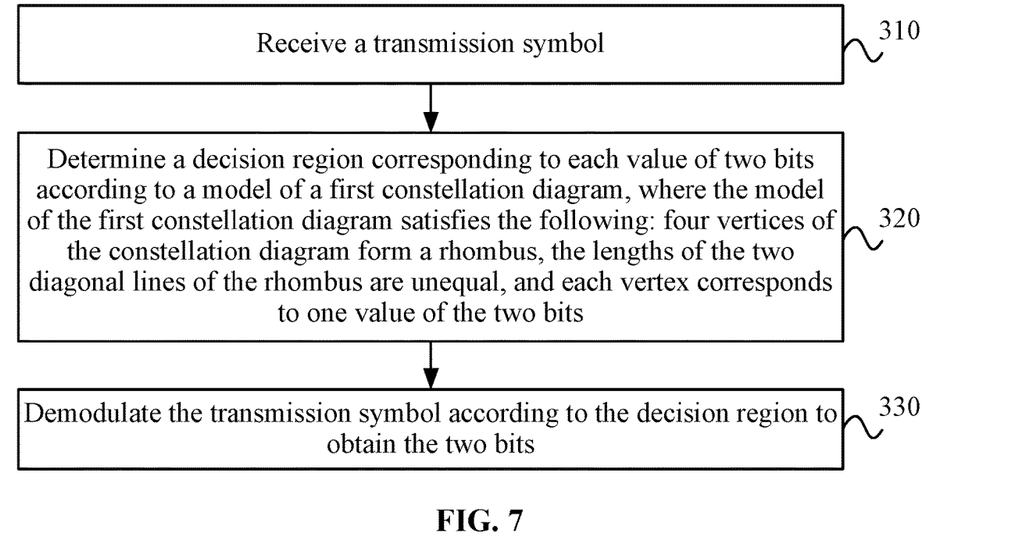
FIG. 7 is a flowchart of a symbol receiving method according to an embodiment.

FIG. 7 is a flowchart of a symbol receiving method according to an embodiment. As shown in FIG. 7, the method provided in this embodiment includes operations 310 to 330.

In 310, a transmission symbol is received.

In 320, a decision region corresponding to each value of two bits is determined according to a model of a first constellation diagram, where the model of the first constellation diagram satisfies the following: four vertices of the constellation diagram form a rhombus, the lengths of the two diagonal lines of the rhombus are unequal, and each vertex corresponds to one value of the two bits.

In 330, the transmission symbol is demodulated according to the decision region to obtain the two bits.

In this embodiment, the decision region corresponding to each value of the two bits may be determined according to the four vertices in the model of the first constellation diagram. In other words, the decision region may be determined according to $A_s$ and $A_b$. At least one boundary of the decision region may be a parabola, a semi-ellipse or an arc formed by connecting points of different curvatures, as long as the requirement that the decision region corresponding to each value of the two bits is close to a crescent is satisfied, that is, the decision region is relatively wide in the part where the probability of appearance of the received points is higher and is relatively narrow in the part where the probability of appearance of the received points is lower. In this manner, the decision region matches the true distribution of the points corresponding to transmission symbols, thereby reducing the bit error ratio and improving the accuracy of data transmission. This embodiment does not limit the manner of determining the decision region corresponding to each value of the two bits according to $A_s$ and $A_b$.

Figure 8:
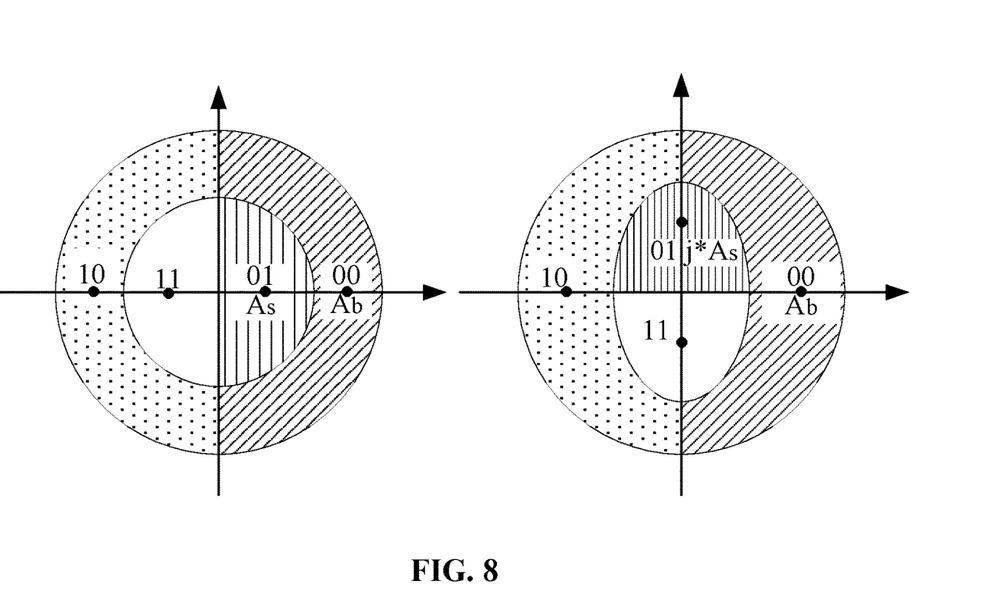
FIG. 8 is a comparison diagram of two types of decision regions according to an embodiment.

FIG. 8 is a comparison diagram of two types of decision regions according to an embodiment. As shown in FIG. 8, in the decision region shown on the left, the decision region of each value of the two bits is a uniform ring or a uniform sector. At this point, the points on the boundaries of the decision region corresponding to one value have an equal curvature, but such a decision region does not match the true distribution of the received points. In the decision region shown on the right, the decision region is the decision region of the model of the first constellation diagram of this embodiment, and at least one boundary of the decision region of each value of the two bits is a semi-ellipse so that the decision region is close to a crescent. For example, the decision region corresponding to the value "01" of the two bits is the decision region filled with vertical lines shown on the right in FIG. 8; the decision region corresponding to the value "00" of the two bits is the decision region filled with diagonal lines shown on the right in FIG. 8; the decision region corresponding to the value "10" of the two bits is the decision region filled with dots shown on the right in FIG. 8; and the decision region corresponding to the value "11" of the two bits is the white decision region shown on the right in FIG. 8. As such, the decision region shown on the right of FIG. 8 better matches the true distribution of the received points.

In an embodiment, the locations of the four vertices in the constellation diagram are $A_b*\exp(j*\theta_0)$, $A_s*\exp(j*(\pi/2+\theta_0))$, $-A_b*\exp(j*\theta_0)$, and $-A_s*\exp(j*(\pi/2+\theta_0))$, respectively, where $A_b$ and $A_s$ are two unequal real numbers, and $\theta_0$ is a real number.

In an embodiment, the four vertices correspond to the following values of the two bits: 00, 01, 10, and 11, respectively. Alternatively, the four vertices correspond to the following values of the two bits: 00, 01, 11, and 10, respectively.

In an embodiment, $A_b$ and $A_s$ satisfy that $|A_b|^2+|A_s|^2=2$.

In an embodiment, at least one boundary of the decision region corresponding to each value is a semi-ellipse or a parabola, as shown in FIG. 8.

In an embodiment, operation 330 includes 331 and 332.

In 331, a log-likelihood ratio (LLR) of the transmission symbol belonging to each decision region is calculated according to the Euclidean distance between the transmission symbol and each vertex of the constellation diagram and the rotation angle of the transmission symbol with respect to each coordinate axe of the constellation diagram.

In 332, bits corresponding to a decision region corresponding to the maximum LLR are taken as the two bits.

In this embodiment, based on the decision region determined according to the model of the first constellation diagram, the LLR of the received transmission symbol belonging to each decision region is calculated, and it is decided that the transmission symbol corresponds to the two bits represented by the decision region to which the maximum LLR belongs, thereby improving the accuracy of symbol reception and demodulation. For example, in the decision region shown on the right of FIG. 8, the LLR of the transmission symbol belonging to the decision region filled with vertical lines is the maximum, so the data obtained after the transmission symbol is demodulated is "01". This embodiment does not limit the manners of calculating the Euclidean distance, the rotation angle, and the LLR.

Figure 9:
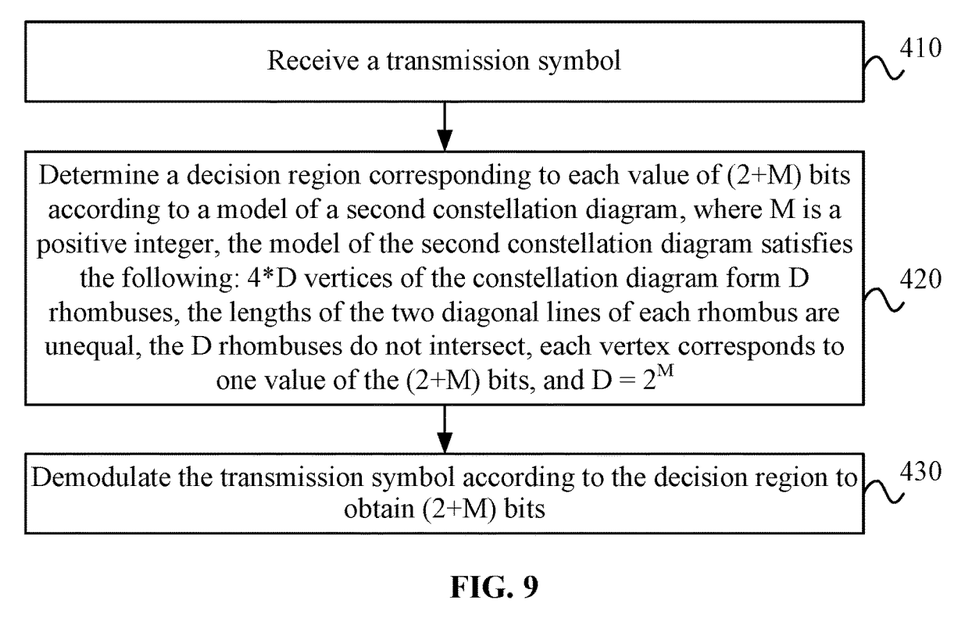
FIG. 9 is a flowchart of another symbol receiving method according to an embodiment.

FIG. 9 is a flowchart of another symbol receiving method according to an embodiment. As shown in FIG. 9, the method provided in this embodiment includes operations 410 to 430.

In 410, a transmission symbol is received.

In 420, a decision region corresponding to each value of (2+M) bits is determined according to a model of a second constellation diagram, where M is a positive integer, the model of the second constellation diagram satisfies the following: 4*D vertices of the constellation diagram form D rhombuses, the lengths of the two diagonal lines of each rhombus are unequal, the D rhombuses do not intersect, each vertex corresponds to one value of the (2+M) bits, and $D=2^M$.

In 430, the transmission symbol is demodulated according to the decision region to obtain the (2+M) bits.

In this embodiment, the decision region corresponding to each value of the (2+M) bits (that is, (2+log 2*D) bits) may be determined according to the 4*D vertices in the model of the second constellation diagram. In other words, the decision region may be determined according to Abk and Ask (k=1, 2, . . . , D). At least one boundary of each decision region may be a parabola, a semi-ellipse, or an arc formed by connecting points of different curvatures, as long as the requirement that the decision region corresponding to each value of the (2+M) bits is close to a crescent is satisfied, so that the decision region matches the true distribution of the points corresponding to transmission symbols. Moreover, the rhombuses do not overlap so that even if the transmission symbol rotates, the modulation method in this embodiment can reduce the false decision and lower the bit error ratio. This embodiment does not limit the manner of determining the decision region corresponding to each value of the (2+M) bits according to Abk and Ask (k=1, 2, . . . , D).

In this embodiment, the data is demodulated according to the decision region of the model of the second constellation diagram so that the corresponding decision region for demodulation better matches the true distribution of the points corresponding to the received transmission symbols, thereby reducing the bit error ratio and improving the accuracy and efficiency of data transmission.

In an embodiment, the locations of the 4*D vertices in the constellation diagram include $\pm A_{bk}*\exp(j*\theta_0)$ and $\pm A_{sk}*\exp(j*(\pi/2+\theta_0))$ where k=1, 2, . . . , D, $A_{s1}<A_{b1}<A_{s2}<A_{b2}< \ldots <A_{sD}<A_{bD}$, and $\theta_0$ is a real number.

In an embodiment, $A_{s1}, A_{b1}, A_{s2}, A_{b2}, \ldots, A_{sD},$ and $A_{bD}$ form an arithmetic progression.

In an embodiment, $A_{s1}, A_{b1}, A_{s2}, A_{b2}, \ldots, A_{sD},$ and $A_{bD}$ are each a product of an element in an arithmetic progression and a power normalization factor.

In an embodiment, at least one boundary of the decision region corresponding to each value is a semi-ellipse or a parabola; for two adjacent rhombuses, the long axis of a semi-ellipse or the directrix of a parabola of a decision region corresponding to the four vertices of the first rhombus is perpendicular to the long axis of a semi-ellipse or the directrix of a parabola of a decision region corresponding to the four vertices of the second rhombus.

Figure 10:
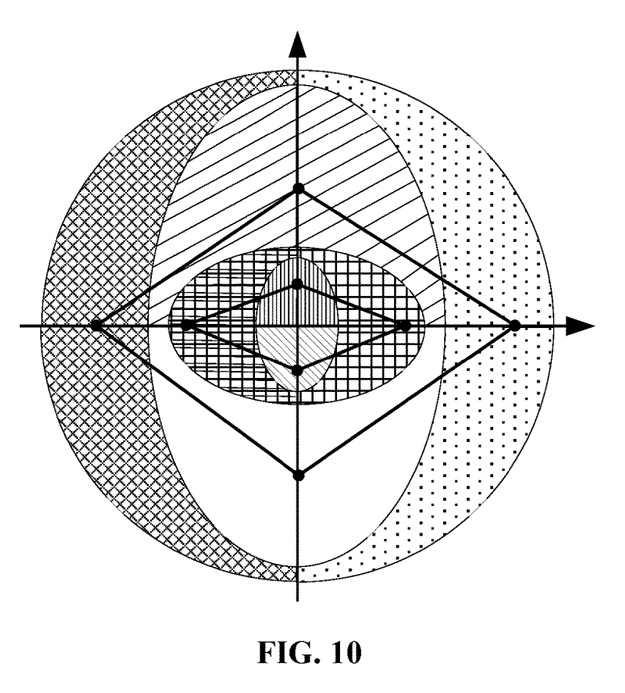
FIG. 10 is a schematic diagram of decision regions of a model of a second constellation diagram containing four rhombuses according to an embodiment.

FIG. 10 is a schematic diagram of decision regions of a model of a second constellation diagram containing four rhombuses according to an embodiment. The model of the second constellation diagram containing four rhombuses is shown in FIG. 10, where the four vertices of each ellipse (the circle formed by four outermost vertices) form a rhombus, and different shadows represent decision regions of different values. For example, the rhombus corresponding to the decision region represented by the sparse horizontal grids is adjacent to the rhombus corresponding to the white decision region. The long axis of the outer boundary (semi-ellipse) of the decision region represented by the sparse horizontal grids is in the direction of the horizontal axis, the long axis of the outer boundary (semi-ellipse) of the white decision region is in the direction of the vertical axis, and the two long axes are perpendicular to each other. On this basis, the bit error ratio among the bit values of represented by the vertices of different rhombuses can be reduced.

In an embodiment, operation 430 includes 431 and 432.

In 431, a log-likelihood ratio of the transmission symbol belonging to each decision region is calculated according to the Euclidean distance between the transmission symbol and each vertex of the constellation diagram and the rotation angle of the transmission symbol with respect to each coordinate axe of the constellation diagram. In 432, bits corresponding to a decision region corresponding to the maximum log-likelihood ratio are taken as the (2+M) bits.

In this embodiment, on the basis of determining the decision region according to the model of the second constellation diagram, the LLR of the received transmission symbol belonging to each decision region is calculated, and it is decided that the transmission symbol corresponds to the (2+M) bits represented by the decision region corresponding to the largest LLR, thereby improving the accuracy of symbol reception and demodulation.

Figure 11:
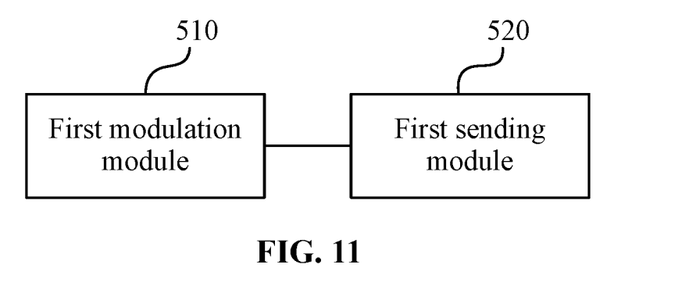
FIG. 11 is a structure diagram of a symbol sending apparatus according to an embodiment.

The embodiments of the present application further provide a symbol sending apparatus. FIG. 11 is a structure diagram of a symbol sending apparatus according to an embodiment. As shown in FIG. 11, the symbol sending apparatus includes a first modulation module 510 and a first sending module 520.

The first modulation module 510 is configured to modulate two bits according to a model of a first constellation diagram to obtain a transmission symbol, where the model of the first constellation diagram satisfies the following: four vertices of the constellation diagram form a rhombus, the lengths of the two diagonal lines of the rhombus are unequal, and each vertex corresponds to one value of the two bits. The first sending module 520 is configured to send the transmission symbol.

In the symbol sending apparatus in this embodiment, the data is modulated according to the rhombus constellation diagram so that the corresponding decision region for demodulation better matches the true distribution of the points corresponding to the received transmission symbols, thereby reducing the bit error ratio and improving the accuracy of data transmission.

In an embodiment, the locations of the four vertices in the constellation diagram are $A_b*\exp(j*\theta_0)$, $A_s*\exp(j*(\pi/2+\theta_0))$, $-A_b*\exp(j*\theta_0)$, and $-A_s*\exp(j*(\pi/2+\theta_0))$, respectively, where $A_b$ and $A_s$ are two unequal real numbers, and $\theta_0$ is a real number.

In an embodiment, the four vertices correspond to the following values of the two bits: 00, 01, 10, and 11, respectively; or, the four vertices correspond to the following values of the two bits: 00, 01, 11, and 10, respectively.

In an embodiment, $A_b$ and $A_s$ satisfy that $|A_b|^2+|A_s|^2=2$.

The symbol sending apparatus provided in this embodiment and the symbol sending method provided in the preceding embodiments belong to the same inventive concept. For technical details not described in detail in this embodiment, reference may be made to any one of the preceding embodiments, and this embodiment has the same effects as the executed symbol sending method.

Figure 12:
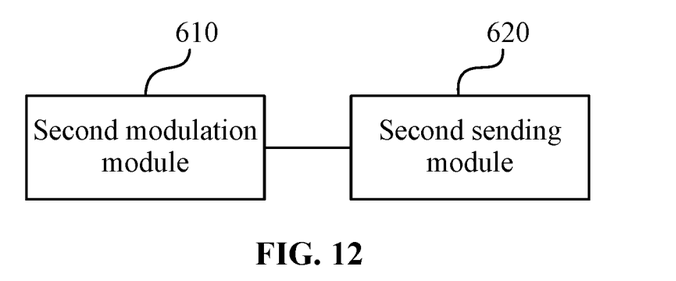
FIG. 12 is a structure diagram of another symbol sending apparatus according to an embodiment.

FIG. 12 is a structure diagram of another symbol sending apparatus according to an embodiment. As shown in FIG. 12, the symbol sending apparatus includes a second modulation module 610 and a second sending module 620.

The second modulation module 610 is configured to modulate (2+M) bits according to a model of a second constellation diagram to obtain a transmission symbol, where M is a positive integer, and the model of the second constellation diagram satisfies the following: 4*D vertices of the constellation diagram form D rhombuses, the lengths of the two diagonal lines of each rhombus are unequal, the D rhombuses do not intersect, each vertex corresponds to one value of the (2+M) bits, and $D=2^M$. The second sending module 620 is configured to send the transmission symbol.

In the symbol sending apparatus in this embodiment, the data is modulated according to the model of the second constellation diagram so that the corresponding decision region for demodulation better matches the true distribution of the points corresponding to the received transmission symbols, thereby reducing the bit error ratio and improving the accuracy and efficiency of data transmission.

In an embodiment, the locations of the 4*D points in the constellation diagram include $\pm A_{bk}*\exp(j*\theta_0)$ and $\pm a_{sk}*\exp(j*(\pi/2+\theta_0))$ where $k=1, 2, \ldots, D$, $A_{s1}<A_{b1}<A_{s2}<A_{b2}<\ldots<A_{sD}<A_{bD}$, and $\theta_0$ is a real number.

In an embodiment, $A_{s1}, A_{b1}, A_{s2}, A_{b2}, \ldots, A_{sD}$, and $A_{bD}$ form an arithmetic progression.

In an embodiment, $A_{s1}, A_{b1}, A_{s2}, A_{b2}, \ldots, A_{sD}$, and $A_{bD}$ are each a product of an element in an arithmetic progression and a power normalization factor.

The symbol sending apparatus provided in this embodiment and the symbol sending method provided in the preceding embodiments belong to the same inventive concept. For technical details not described in detail in this embodiment, reference may be made to any one of the preceding embodiments, and this embodiment has the same effects as the executed symbol sending method.

Figure 13:
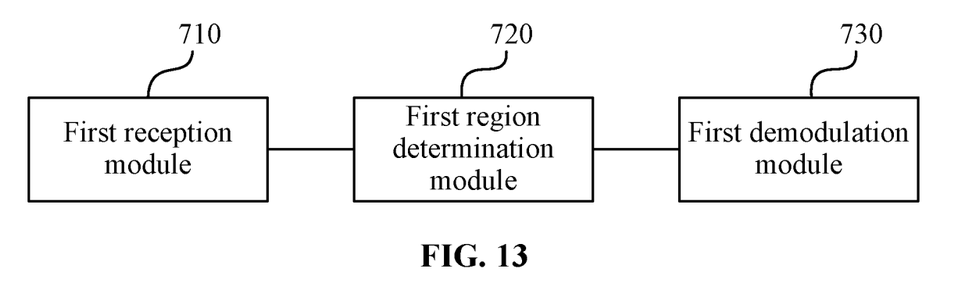
FIG. 13 is a structure diagram of a symbol receiving apparatus according to an embodiment.

The embodiments of the present application further provide a symbol receiving apparatus. FIG. 13 is a structure diagram of a symbol receiving apparatus according to an embodiment. As shown in FIG. 13, the symbol receiving apparatus includes a first reception module 710, a first region determination module 720, and a first demodulation module 730.

The first reception module 710 is configured to receive a transmission symbol. The first region determination module 720 is configured to determine a decision region corresponding to each value of two bits according to a model of a first constellation diagram, where the model of the first constellation diagram satisfies the following: four vertices of the constellation diagram form a rhombus, the lengths of the two diagonal lines of the rhombus are unequal, and each vertex corresponds to one value of the two bits. The first demodulation module 730 is configured to demodulate the transmission symbol according to the decision region to obtain the two bits.

In the symbol receiving apparatus in this embodiment, the data is demodulated according to the rhombus constellation diagram so that the corresponding decision region for demodulation better matches the true distribution of the points corresponding to the received transmission symbols, thereby reducing the bit error ratio and improving the accuracy of data transmission.

In an embodiment, the locations of the four vertices in the constellation diagram are $A_b*\exp(j*\theta_0)$, $A_s*\exp(j*(\pi/2+\theta_0))$, $-A_b*\exp(j*\theta_0)$, and $-A_s*\exp(j*(\pi/2+\theta_0))$, respectively, where $A_b$ and $A_s$ are two unequal real numbers, and $\theta_0$ is a real number.

In an embodiment, the four vertices correspond to the following values of the two bits: 00, 01, 10, and 11, respectively; or, the four vertices correspond to the following values of the two bits: 00, 01, 11, and 10, respectively.

In an embodiment, $A_b$ and $A_s$ satisfy that $|A_b|^2+|A_s|^2=2$.

In an embodiment, at least one boundary of the decision region corresponding to each value is a semi-ellipse or a parabola.

In an embodiment, the first demodulation module 730 is configured to:

calculate a log-likelihood ratio of the transmission symbol belonging to each decision region according to the Euclidean distance between the transmission symbol and each of the four vertices of the constellation diagram and the rotation angle of the transmission symbol with respect to each coordinate axe of the constellation diagram; and take bits which correspond to a decision region to which the maximum log-likelihood ratio belongs as the two bits.

The symbol receiving apparatus provided in this embodiment and the symbol receiving method provided in the preceding embodiments belong to the same inventive concept. For technical details not described in detail in this embodiment, reference may be made to any one of the preceding embodiments, and this embodiment has the same effects as the executed symbol receiving method.

Figure 14:
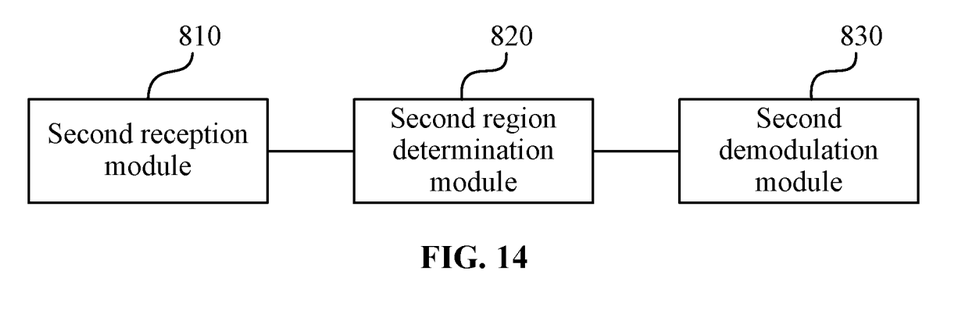
FIG. 14 is a structure diagram of another symbol receiving apparatus according to an embodiment.

FIG. 14 is a structure diagram of another symbol receiving apparatus according to an embodiment. As shown in FIG. 14, the symbol receiving apparatus includes a second reception module 810, a second region determination module 820, and a second demodulation module 830.

The second reception module 810 is configured to receive a transmission symbol. The second region determination module 820 is configured to determine a decision region corresponding to each value of (2+M) bits according to a model of a second constellation diagram, where M is a positive integer, and the model of the second constellation diagram satisfies the following: 4*D vertices of the constellation diagram form D rhombuses, the lengths of the two diagonal lines of each rhombus are unequal, the D rhombuses do not intersect, each vertex corresponds to one value of the (2+M) bits, and $D=2^M$. The second demodulation module 830 is configured to demodulate the transmission symbol according to the decision region to obtain the (2+M) bits.

In the symbol receiving apparatus in this embodiment, the data is demodulated according to the decision region of the model of the second constellation diagram so that the corresponding decision region for demodulation better matches the true distribution of the points corresponding to the received transmission symbols, thereby reducing the bit error ratio and improving the accuracy and efficiency of data transmission.

In an embodiment, the locations of the 4*D vertices in the constellation diagram include: $\pm A_{bk}*\exp(j*\theta_0)$ and $\pm A_{sk}*\exp(j*(\pi/2+\theta_0))$ where k=1, 2, ..., D, $A_{s1}<A_{b1}<A_{s2}<A_{b2}<...<A_{sD}<A_{bD}$, and $\theta_0$ is a real number.

In an embodiment, $A_{s1}, A_{b1}, A_{s2}, A_{b2}, ..., A_{sD}$, and $A_{bD}$ form an arithmetic progression.

In an embodiment, $A_{s1}, A_{b1}, A_{s2}, A_{b2}, ..., A_{sD}$, and $A_{bD}$ are each a product of an element in an arithmetic progression and a power normalization factor.

In an embodiment, at least one boundary of the decision region corresponding to each value is a semi-ellipse or a parabola; for two adjacent rhombuses, the long axis of a semi-ellipse or the directrix of a parabola of a decision region corresponding to the four vertices of the first rhombus is perpendicular to the long axis of a semi-ellipse or the directrix of a parabola of a decision region corresponding to the four vertices of the second rhombus.

In an embodiment, the second demodulation module 830 is configured to:

calculate a log-likelihood ratio of the transmission symbol belonging to each decision region according to the Euclidean distance between the transmission symbol and each of the 4*D vertices of the constellation diagram and the rotation angle of the transmission symbol with respect to each coordinate axe of the constellation diagram; and take bits corresponding to a decision region to which the maximum log-likelihood ratio belongs as the (2+M) bits.

The symbol receiving apparatus provided in this embodiment and the symbol receiving method provided in the preceding embodiments belong to the same inventive concept. For technical details not described in detail in this embodiment, reference may be made to any one of the preceding embodiments, and this embodiment has the same effects as the executed symbol receiving method.

Figure 15:
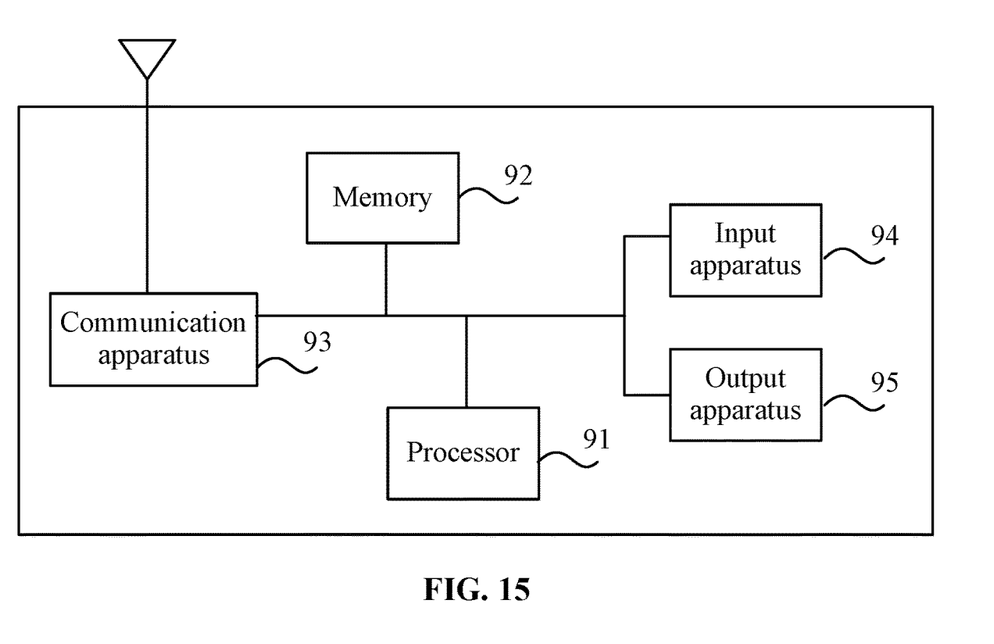
FIG. 15 is a structure diagram of the hardware of a sending device according to an embodiment.

The embodiments of the present application further provide a sending device. FIG. 15 is a structure diagram of the hardware of a sending device according to an embodiment. As shown in FIG. 15, the sending device provided by the present application includes a memory 92, a processor 91, and a computer program stored on the memory 92 and executable by the processor 91, and when executing the program, the processor performs the symbol sending method described above.

The sending device may further include the memory 92; one or more processors 91 may be provided in the sending device, and one processor 91 is illustrated in FIG. 15 as an example. The memory 92 is configured to store one or more programs; the one or more programs, when executed by the one or more processors 91, cause the one or more processors 91 to perform the symbol sending method described in the embodiments of the present application.

The sending device further includes a communication apparatus 93, an input apparatus 94, and an output apparatus 95.

The processor 91, the memory 92, the communication apparatus 93, the input apparatus 94, and the output apparatus 95 in the sending device may be connected via a bus or in other manners. In FIG. 15, connection via a bus is performed by way of example.

The input apparatus 94 may be used for receiving input digital or character information and generating keying signal input related to user settings of the sending device and function control of the sending device. The output apparatus 95 may include a display device such as a display screen.

The communication apparatus 93 may include a receiver and a sender. The communication apparatus 93 is configured to perform information transceiving and communication under the control of the processor 91.

As a computer-readable storage medium, the memory 92 may be configured to store software programs, computer-executable programs, and modules such as program instructions/modules (for example, the first modulation module 510 and the first sending module 520 in the symbol sending apparatus) corresponding to the symbol sending method described in the embodiments of the present application. The memory 92 may include a program storage region and a data storage region. The program storage region may store an operating system and an application program required by at least one function. The data storage region may store data created according to the use of the sending device. In addition, the memory 92 may include a high-speed random-access memory and may also include a non-volatile memory such as at least one disk memory, a flash memory or another non-volatile solid-state memory. In some examples, the memory 92 may include memories remotely disposed with respect to the processor 91, and these remote memories may be connected to the sending device via a network. Examples of the preceding network include, but are not limited to, the Internet, an intranet, a local area network, a mobile communication network, and combinations thereof.

Figure 16:
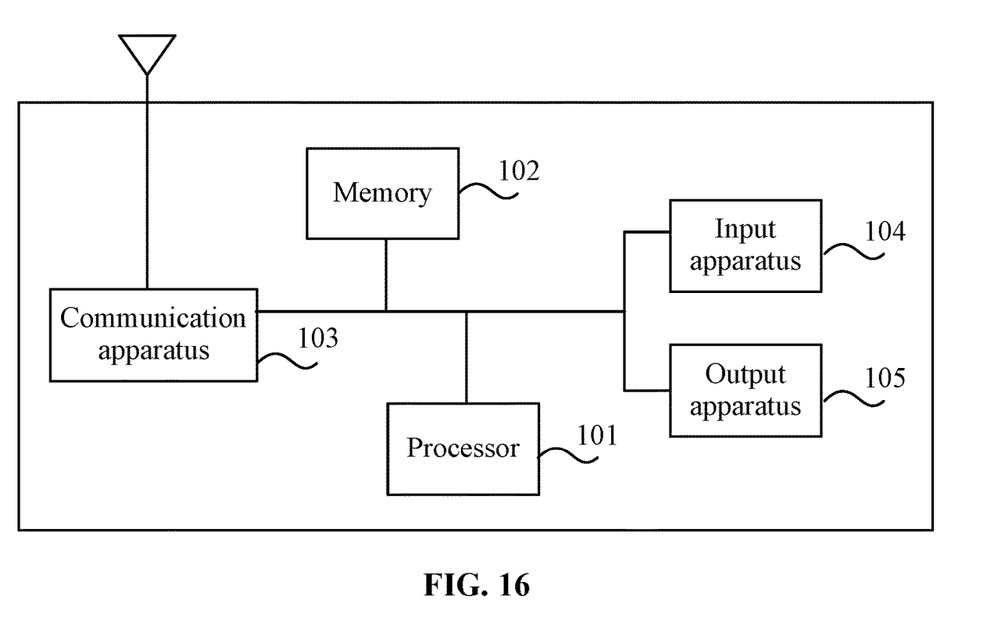
FIG. 16 is a structure diagram of the hardware of a receiving device according to an embodiment.

The embodiments of the present application further provide a receiving device. FIG. 16 is a structure diagram of the hardware of a receiving device according to an embodiment. As shown in FIG. 16, the receiving device provided by the present application includes a memory 102, a processor 101, and a computer program stored on the memory 102 and executable by the processor 101, where the processor, when executing the program, performs the symbol receiving method described above.

The receiving device may further include the memory 102; one or more processors 101 may be provided in the receiving device, and one processor 101 is illustrated in FIG. 16 as an example. The memory 102 is configured to store one or more programs; when executed by the one or more processors 101, the one or more programs cause the one or more processors 101 to perform the symbol receiving method described in the embodiments of the present application.

The receiving device further includes a communication apparatus 103, an input apparatus 104, and an output apparatus 105.

The processor 101, the memory 102, the communication apparatus 103, the input apparatus 104, and the output apparatus 105 in the receiving device may be connected via a bus or in other manners. In FIG. 16, connection via a bus is performed by way of example.

The input apparatus 104 may be used for receiving input digital or character information and generating keying signal input related to user settings of the receiving device and function control of the receiving device. The output apparatus 105 may include a display device such as a display screen.

The communication apparatus 103 may include a receiver and a sender. The communication apparatus 103 is configured to perform information transceiving and communication under the control of the processor 101.

As a computer-readable storage medium, the memory 102 may be configured to store software programs, computer-executable programs, and modules such as program instructions/modules (for example, the first reception module 710, the first region determination module 720, and the first demodulation module 730 in the symbol receiving apparatus) corresponding to the symbol receiving method described in the embodiments of the present application. The memory 102 may include a program storage region and a data storage region. The program storage region may store an operating system and an application program required by at least one function. The data storage region may store data created according to the use of the receiving device. In addition, the memory 102 may include a high-speed random-access memory and may also include a non-volatile memory such as at least one disk memory, a flash memory or another non-volatile solid-state memory. In some examples, the memory 102 may include memories which are remotely disposed with respect to the processor 101, and these remote memories may be connected to the receiving device via a network. Examples of the preceding network include, but are not limited to, the Internet, an intranet, a local area network, a mobile communication network, and combinations thereof.

The embodiments of the present application further provide a storage medium. The storage medium is configured to store a computer program, where the computer program, when executed by a processor, implements the symbol sending method or the symbol receiving method in any one of the embodiments of the present application. The symbol sending method includes the following: modulating two bits according to a model of the first constellation diagram to obtain a transmission symbol, where the model of the first constellation diagram satisfies the following: four vertices of the constellation diagram form a rhombus, the lengths of the two diagonal lines of the rhombus are unequal, and each vertex corresponds to one value of the two bits; and sending the transmission symbol. Alternatively, the symbol sending method includes the following: modulating (2+M) bits according to a model of a second constellation diagram to obtain a transmission symbol, where M is a positive integer, the model of the second constellation diagram satisfies the following: 4*D vertices of the constellation diagram form D rhombuses, the lengths of the two diagonal lines of each rhombus are unequal, the D rhombuses do not intersect, each vertex corresponds to one value of the (2+M) bits, and $D=2^M$; and sending the transmission symbol.

The symbol receiving method includes the following: receiving a transmission symbol; determining a decision region corresponding to each value of two bits according to a model of a first constellation diagram, where the model of the first constellation diagram satisfies the following: four vertices of the constellation diagram form a rhombus, the lengths of the two diagonal lines of the rhombus are unequal, and each vertex corresponds to one value of the two bits; and demodulating the transmission symbol according to the decision region to obtain two bits. Alternatively, the symbol receiving method includes the following: receiving a transmission symbol; determining a decision region corresponding to each value of (2+M) bits according to a model of a second constellation diagram, where M is a positive integer, the model of the second constellation diagram satisfies the following: 4*D vertices of the constellation diagram form D rhombuses, the lengths of the two diagonal lines of each rhombus are unequal, the D rhombuses do not intersect, each vertex corresponds to one value of the (2+M) bits, and $D=2^M$; and demodulating the transmission symbol according to the decision region to obtain the (2+M) bits.

A computer storage medium in the embodiments of the present application may adopt any combination of one or more computer-readable media. The computer-readable medium may be a computer-readable signal medium or a computer-readable storage medium. The computer-readable storage medium may be, but is not limited to, an electrical, magnetic, optical, electromagnetic, infrared or semiconductor system, apparatus or device, or any combination thereof.

Examples (a non-exhaustive list) of the computer-readable storage medium include the following: an electrical connection having one or more wires, a portable computer magnetic disk, a hard disk, a random-access memory (RAM), a read-only memory (ROM), an erasable programmable read-only memory (EPROM), a flash memory, an optical fiber, a portable compact disk read-only memory (CD-ROM), an optical memory, a magnetic memory, or any suitable combination thereof. The computer-readable storage medium may be any tangible medium that can contain or store a program for use by or in connection with an instruction execution system, apparatus or device.

The computer-readable signal medium may include a propagated data signal with computer-readable program codes embodied therein, for example, in a baseband or as a part of a carrier wave. Such a propagated data signal may take any of a variety of forms, including, but not limited to, electro-magnetic, optical, or any suitable combination thereof. The computer-readable signal medium may be any computer-readable medium that is not a computer-readable storage medium and that can communicate, propagate, or transport a program for use by or in connection with an instruction execution system, apparatus or device.

The program codes included on the computer-readable medium may be transmitted via any suitable medium which includes, but is not limited to, a wire, an optical cable, a radio frequency (RF), or any suitable combination thereof.

Computer program codes for performing operations of the present application may be written in one or more programming languages or combinations thereof. The programming languages include object-oriented programming languages such as Java, Smalltalk, and C++, and further include conventional procedural programming languages such as C language or similar programming languages. The program codes may be executed entirely on a user computer, partly on a user computer, as a stand-alone software package, partly on a user computer and partly on a remote computer, or entirely on a remote computer or a server. In a case related to the remote computer, the remote computer may be connected to the user computer via any type of network including a local area network (LAN) or a wide area network (WAN) or may be connected to an external computer (for example, via the Internet through an Internet service provider).

The above are only example embodiments of the present application.

It is to be understood by those skilled in the art that the term "user terminal" covers any suitable type of wireless user devices, for example, a mobile phone, a portable data processing apparatus, a portable web browser or a vehicle-mounted mobile station.

In general, the various embodiments of the present application may be implemented in hardware or special-purpose circuits, software, logic or any combination thereof. For example, some aspects may be implemented in hardware while other aspects may be implemented in firmware or software that may be executed by a controller, a microprocessor or other computing apparatuses, though the present application is not limited thereto.

The embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow among the drawings of the present application may represent program steps, may represent interconnected logic circuits, modules, and functions, or may represent a combination thereof. Computer programs may be stored on the memory. The memory may be of any type suitable for a local technical environment and may be implemented using any suitable data storage technology. The memory may be, but is not limited to, a ROM, a RAM, or an optical memory apparatus and system (for example, a digital video disc (DVD) or a compact disk (CD)). The computer-readable medium may include a non-transitory storage medium. The data processor may be of any type suitable to the local technical environment such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. A symbol sending method, comprising:
   modulating two bits according to a model of a first constellation diagram to obtain a transmission symbol, wherein the model of the first constellation diagram satisfies the following: four vertices of the first constellation diagram form a rhombus, two diagonal lines of the rhombus have unequal lengths, and each of the four vertices corresponds to one value of the two bits; and
   sending the transmission symbol;
   wherein locations of the four vertices in the first constellation diagram are $A_b*\exp(j*\theta_0)$, $A_s*\exp(j*(\pi/2+\theta_0))$, $-A_b*\exp(j*\theta_0)$, and $-A_s*\exp(j*(\pi/2+\theta_0))$, respectively, wherein $A_b$ and $A_s$ are two unequal real numbers, and $\theta_0$ is a real number.

2. The method of claim 1, wherein the four vertices correspond to the following values of the two bits: 00, 01, 10, and 11, respectively; or the four vertices correspond to the following values of the two bits: 00, 01, 11, and 10, respectively.

3. The method of claim 1, wherein $A_b$ and $A_s$ satisfy the following:

$$|A_b|^2+|A_s|=2.$$

4. A sending device, comprising a memory, a processor, and a computer program stored on the memory and executable by the processor, wherein the processor, when executing the computer program, performs the symbol sending method of claim 1.

5. A non-transitory computer-readable storage medium, configured to store a computer program, wherein the computer program, when executed by a processor, implements the symbol sending method of claim 1.

6. A symbol sending method, comprising:
   modulating (2+M) bits according to a model of a second constellation diagram to obtain a transmission symbol, wherein M is a positive integer, the model of the second constellation diagram satisfies the following: 4*D vertices of the second constellation diagram form D rhombuses, two diagonal lines of each of the D rhombuses have unequal lengths, the D rhombuses do not intersect, each vertex of the 4*D vertices corresponds to one value of the (2+M) bits, and $D=2^M$; and
   sending the transmission symbol.

7. The method of claim 6, wherein locations of the 4*D vertices in the second constellation diagram comprise: $\pm A_{bk}*\exp(j*\theta_0)$ and $\pm A_{sk}*\exp(j*(\pi/2+\theta_0))$, wherein k=1, 2, ..., D; $A_{s1}<A_{b1}<A_{s2}<A_{b2}<...<A_{sD}<A_{bD}$; and $\theta_0$ is a real number.

8. The method of claim 7, wherein $A_{s1}$, $A_{b1}$, $A_{s2}$, $A_{b2}$, ..., $A_{sD}$, and $A_{bD}$ form an arithmetic progression.

9. The method of claim 7, wherein $A_{s1}$, $A_{b1}$, $A_{s2}$, $A_{b2}$, ..., $A_{sD}$, and $A_{bD}$ are each a product of a power normalization factor and an element in an arithmetic progression.

10. A sending device, comprising a memory, a processor, and a computer program stored on the memory and executable by the processor, wherein the processor, when executing the computer program, performs the symbol sending method of claim 6.

11. A non-transitory computer-readable storage medium, configured to store a computer program, wherein the computer program, when executed by a processor, implements the symbol sending method of claim 6.

12. A symbol receiving method, comprising:
receiving a transmission symbol;
determining a decision region corresponding to each value of (2+M) bits according to a model of a second constellation diagram, wherein M is a positive integer, and the model of the second constellation diagram satisfies the following: 4*D vertices of the second constellation diagram form D rhombuses, two diagonal lines of each of the D rhombuses have unequal lengths, the D rhombuses do not intersect, each vertex of the 4*D vertices corresponds to one value of the (2+M) bits, and $D=2^M$; and
demodulating the transmission symbol according to the decision region to obtain the (2+M) bits.

13. The method of claim 12, wherein locations of the 4*D vertices in the second constellation diagram comprise: $\pm A_{bk}*\exp(j*\theta_0)$ and $\pm A_{sk}*\exp(j*(\pi/2+\theta_0))$, wherein k=1, 2, ..., D; $A_{s1}<A_{b1}<A_{s2}<A_{b2}<...<A_{sD}<A_{bD}$; and $\theta_0$ is a real number.

14. The method of claim 13, wherein $A_{s1}$, $A_{b1}$, $A_{s2}$, $A_{b2}$, ..., $A_{sD}$, and $A_{bD}$ form an arithmetic progression.

15. The method of claim 13, wherein $A_{s1}$, $A_{b1}$, $A_{s2}$, $A_{b2}$, ..., $A_{sD}$, and $A_{bD}$ are each a product of a power normalization factor and an element in an arithmetic progression.

16. The method of claim 12, wherein at least one boundary of the decision region corresponding to each value of the (2+M) bits is a semi-ellipse or a parabola; and
for two adjacent rhombuses of the D rhombuses, a long axis of a semi-ellipse of a decision region corresponding to four vertices of a first rhombus in the two adjacent rhombuses or a directrix of a parabola of a decision region corresponding to four vertices of a first rhombus in the two adjacent rhombuses is perpendicular to a long axis of a semi-ellipse of a decision region corresponding to four vertices of a second rhombus in the two adjacent rhombuses or a directrix of a parabola of a decision region corresponding to four vertices of a second rhombus in the two adjacent rhombuses.

17. The method of claim 12, wherein demodulating the transmission symbol according to the decision region to obtain the (2+M) bits comprises:
calculating a log-likelihood ratio of the transmission symbol belonging to each decision region according to a Euclidean distance between the transmission symbol and each vertex of the 4*D vertices of the second constellation diagram and a rotation angle of the transmission symbol with respect to each coordinate axe of the second constellation diagram; and
taking bits corresponding to a decision region to which a maximum log-likelihood ratio belongs as the (2+M) bits.

18. A receiving device, comprising a memory, a processor, and a computer program stored on the memory and executable by the processor, wherein the processor, when executing the computer program, performs the symbol receiving method of claim 12.

19. A non-transitory computer-readable storage medium, configured to store a computer program, wherein the computer program, when executed by a processor, implements the symbol receiving method of claim 12.

* * * * *